Figure 1:
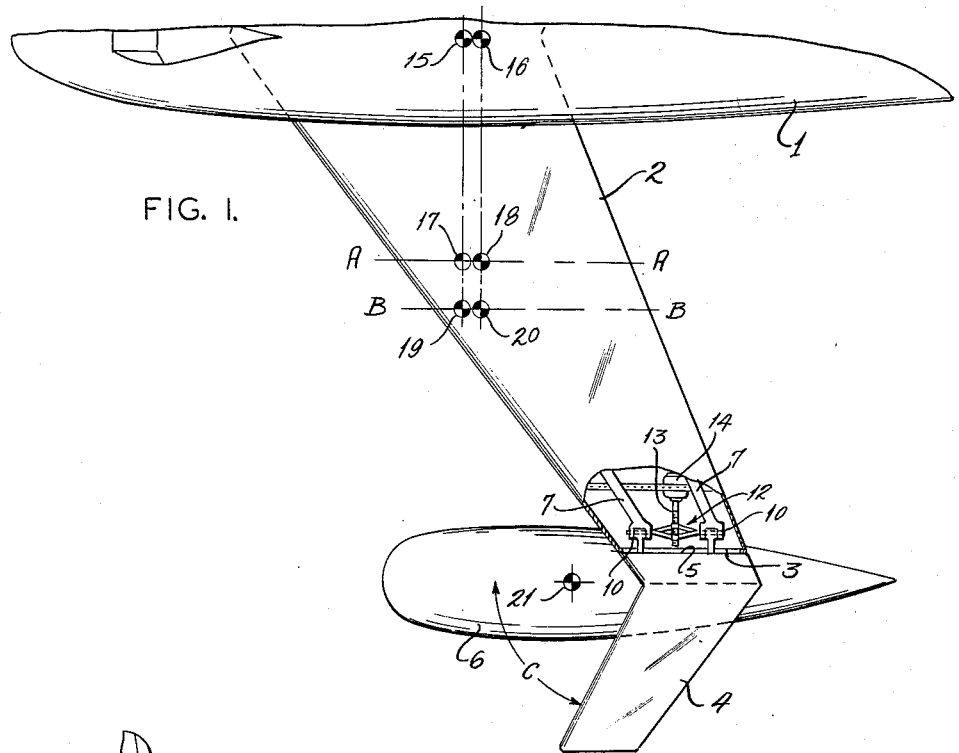

Jan. 9, 1951     A. E. OSTROFF     2,537,369
DROPPABLE WING TANK INCORPORATING ADDITIONAL WING AREA
Filed Jan. 29, 1948

INVENTOR:
Alexander E. Ostroff,
By Carr & Carr & Gravely
HIS ATTORNEYS.

Patented Jan. 9, 1951

2,537,369

UNITED STATES PATENT OFFICE 2,537,369

DROPPABLE WING TANK INCORPORATING ADDITIONAL WING AREA

Alexander E. Ostroff, St. Louis, Mo., assignor to McDonnell Aircraft Corporation, St. Louis, Mo., a corporation of Maryland Application January 29, 1948, Serial No. 5,036

8 Claims. (Cl. 244—135)

This invention relates to aircraft and is more particularly directed to aircraft of the type having droppable wing tips with auxiliary fuel tanks secured thereto.

A serious practicable objection to the addition of droppable fuel tanks to airplanes, particularly those whose wings have a pronounced sweep, is that the center of gravity of the airplane is shifted either too far forward or backward with relation to the mean aerodynamic chord and thus rendering the airplane unstable and uncontrollable. The principal object of the present invention is to devise an airplane of the above type in which the droppable fuel tank is attached to supporting wing tips which are shaped and arranged to shift the mean aerodynamic chord toward or away from the fuselage a distance sufficient to re-establish the proper relationship between it and the center of gravity and thus render the airplane stable and controllable both before and after the wing tips and fuel tanks are jettisoned.

Another object of the invention is to provide an aircraft having a wing normal to or swept back or forward with respect to the longitudinal axis of the fuselage and provided with a stub wing including a fuel tank, said stub wing so related to the first mentioned wing so that the movement of the center of gravity of the plane as the fuel load is decreased is confined to predetermined limits in a lateral horizontal plane along one mean aerodynamic chord and when the tip and its tank are jettisoned, the reverse movement of the center of gravity with relation to another mean aerodynamic chord will be confined to a predetermined limit so that the aircraft stability will be maintained providing for ease of the aircraft control and maneuverability.

Another object of this invention is to provide a droppable wing tip having a fuel tank attached thereto that may be dropped at the option of the pilot and which is so constructed and arranged with reference to the main wing of the aircraft so that the limits of movement of the center of gravity of the aircraft as the fuel tank on the drop wing tip is emptied and then dropped will vary only between narrow limits so that the stability of the aircraft will remain substantially constant.

Figure 2:
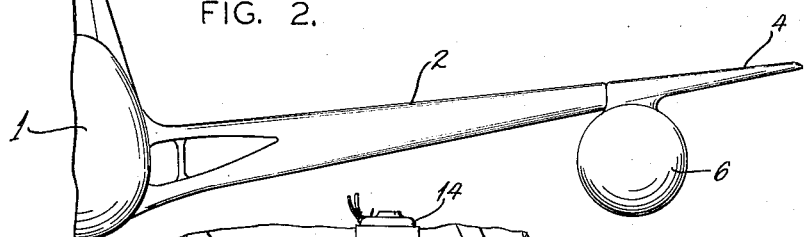
Figure 3:
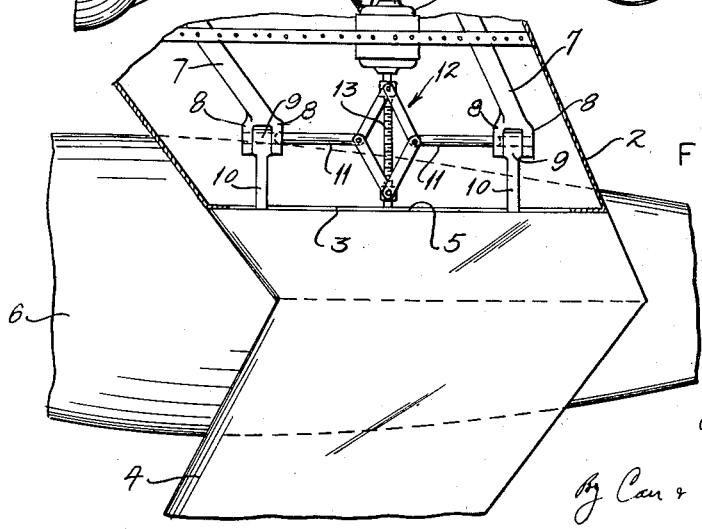

In the drawings:

Fig. 1 is a plan view of a portion of the aircraft fuselage and wing with the drop wing tip and fuel tank thereon, Fig. 2 is a front elevational view thereof; and Fig. 3 is an enlarged view of the wing tip holding structure.

Referring now to the drawings, numeral 1 designates a portion of the fuselage of an aircraft to which a swept back wing 2 is secured in a conventional manner. The outer extremity of this wing tip is provided with an end surface 3, as shown in the drawings, and a stub wing 4 provided with a complemental end surface 5 that is positionable adjacent to the surface 3. A fuel tank 6 is suspended from or embodied in the wing tip 4 and suitable brackets 7 are secured to the internal structure of wing 2, each bracket being provided with eyes 8, 8 which cooperate with eye 9 on each of the brackets 10 that are suitably secured to the fuel tank 6. A pair of pins 11, 11 is associated with a contracting and expanding mechanism 12 provided with a screw 13 having right and left hand threads thereon which engage in right and left hand nuts incorporated in the expanding and contracting mechanism 12. The screw 13 is operated by a reversible motor 14 whose direction of rotation and operation is controlled from a station in the cabin or fuselage within convenient reach of the pilot. When the motor 14 is rotated in one direction, pins 11 will secure wing tip 4 to the wing 2 and when rotated in the opposite direction, they will be withdrawn from the eyes in the brackets so that the tank 6 and wing 4 may be detached from the wing 2. Fig. 1 shows the pins inserted in the eyes of the brackets and Fig. 3 shows the pins withdrawn so that the wings 4 and 6 are detached therefrom and in condition for dropping therefrom.

The need for increased range of aircraft without increasing the over-all size of the basic airplane has required the use of external fuel tanks. These tanks create an additional drag when installed on the plane and it becomes necessary, therefore, to position and locate these tanks so that the least interference occurs with the stability of the aircraft and its maneuverability. One of the contributing factors to the selection of the position and shape of the auxiliary tanks is that they are used only during the time that the plane is cruising and consequently operate at a relatively high lift co-efficient where the induced drag is an important part of the total drag of the plane and consequently the aspect ratio plays an important part. The effective aspect ratio is increased by adding end plates on the wing tips and this situation is substantially similar to that created by the placing of external wing tanks at the wing tips. Therefore, in the cruising range, the tip tanks tend to reduce the induced drag and thereby partially or totally compensate for their friction and form drag. The use of swept back wings for high speed aircraft introduces other problems that must be considered and solved in order that the center of gravity will be confined to predetermined narrow limits of motion.

As indicated in the drawings, various circles are shown on the plan view of the wing and the portion of the fuselage structure illustrated.

As shown in Fig. 1, 15 designates the center of gravity of the plane when the wing tip tank is empty and 20 indicates the approximate location of the wing center of gravity when the tip tank is partially filled and the circle 21 indicates the approximate location of the center of gravity of the tip tank when it is filled. As will be noted by the center of gravity locations in Fig. 1 of the drawings, the wing tip tank is considerably aft of the airplane center of gravity. Consequently the center of gravity of the plane moves rearwardly when the tank and wing are installed. Rearward movement of the center of gravity outside of a permissible percentage range results in an inability to maintain the plane stable when in operation. Permissible movements are defined as a percentage of the mean aerodynamic chord. The mean aerodynamic chord is a chord of a theoretical rectangular wing which would produce the same aerodynamic effect as the actual wing. In Fig. 1 of the drawings the line A—A represents the mean aerodynamic chord of the wing without a tip tank. It should be noted that the center of gravity of the wing without the tip tank is at 25% of the mean aerodynamic chord but when the tip tank is installed, the center of gravity moves aft to 35% of the mean aerodynamic chord. Generally speaking, 25% of the mean aerodynamic chord is an acceptable position of the center of gravity but 35% will be too far aft and leads to the aforesaid stability problems. However, this situation is corrected by adding a stub wing 4 to the outboard side of the tip tank. This stub wing will change the position of the mean aerodynamic chord to the line B—B. It will now be noted that the most aft center of gravity position with the tank installed is 27% of this new or combined mean aerodynamic chord which, generally speaking, is an acceptable position or within the predetermined safe limits.

As fuel is burned from the tip tank, the center of gravity moves forward until at such a time when all the fuel is burned it has moved to a position approximately 18% of the combined mean aerodynamic chord which might be too far forward for good handling and stable operation of the plane. However, at this point, the pilot jettisons the tip tank and the stub wing whereupon the mean aerodynamic chord returns to the line A—A. The wing center of gravity now is, therefore, at 25% of the mean aerodynamic chord line A—A, thus locating it at a position within the safe predetermined range of motion of the center of gravity.

The application of a stub wing to a jettisonable external tank in the manner illustrated is such that the mean aerodynamic chord of the main and stub wing combined is placed in an advantageous position with respect to the plane center of gravity. An additional effort is gained by the stub wing which provides an increase in aspect ratio and a decrease in induced drag. Also, the wing area is increased, thereby reducing the wing loading for take-off and climbing. It should be noted that the angle C and the area of the stub wing can be varied to any desired value so that the most desirable location of the mean aerodynamic chord is obtained.

The movement of the center of gravity in a horizontal plane with respect to the mean aerodynamic chord in any aircraft can be controlled by relating a wing tip, not provided with a fuel tank, to the main wing so that said center of gravity movement will be confined to certain narrowly defined limits as the plane load changes whether the wings project at right angles from the fuselage or are swept back therefrom or extend outwardly from the fuselage in any other direction.

What I claim is:

1. In an aircraft, a fuselage; a swept back wing secured to said fuselage, whose mean aerodynamic chord is in one position; an auxiliary fuel tank; a droppable wing tip for supporting said tank and securable to said wing and so shaped as to shift the mean aerodynamic chord of said wing in parallel relation thereto outwardly from the fuselage, said wing tip and tank maintaining the center of gravity of said wing fuselage, tip and tank within an allowable percentage range of movement along said last mentioned chord; and means for releasing said droppable wing tip and tank from said wing after said fuel tank has been emptied so that the center of gravity of said wing and fuselage is maintained within allowable percentage range of movement along the first mentioned mean aerodynamic chord of said wing.

2. In an aircraft, a fuselage; a swept back wing secured thereto; and a fuel tank provided with a forwardly projecting stub wing and securable to said wing, said forwardly projecting stub wing so related to said wing that the movement of the center of gravity of said wing as related to its mean aerodynamic chord will be confined to predetermined limits, and when the wing tip and tank are detached from said wing the movement of the center of gravity will be confined to predetermined limits with reference to a mean aerodynamic chord displaced from said first mentioned chord.

3. In an aircraft, a fuselage; a swept back wing secured to said fuselage; an auxiliary fuel tank; a droppable wing for supporting said tank and secured to the outboard end of said wing and so related thereto that the percentage range of movement of the center of gravity of the aircraft will be confined to predetermined limits along its mean aerodynamic chord when the wing tank is being emptied but moving beyond said range after the tank is emptied; and means for releasing said droppable wing from said swept back wing after said wing tank is emptied for causing the mean aerodynamic chord of the aircraft to be shifted, the center of gravity of the aircraft then being shifted for movement along the last mentioned mean aerodynamic chord within an allowable percentage range.

4. In an aircraft, a fuselage; a swept back wing secured to said fuselage, said wing and fuselage having a mean aerodynamic chord along which the center of gravity thereof moves within allowable percentage range under normal loading; a detachable swept forward tip for said wing; and means for loading said tip, said tip and said means shifting the mean aerodynamic chord of the aircraft outwardly so that the center of gravity of said fuselage, tip and said means for loading said tip is movable within an allowable percentage range along the shifted mean aerodynamic chord.

5. In an aircraft, a fuselage; a wing secured to said fuselage, said wing and fuselage having a mean aerodynamic chord along which the center of gravity thereof moves within an allowable percentage range; a detachable wing tip whose longitudinal axis is angularly disposed with respect to the longitudinal axis of said wing; and means for loading said wing tip, said tip and said means shifting the mean aerodynamic chord of the aircraft outwardly so that the center of gravity of said fuselage, wing, wing tip and said means for loading being movable within an allowable percentage range along the displaced mean aerodynamic chord.

6. In an aircraft, a fuselage; a swept back wing secured to said fuselage, the center of gravity of said fuselage and wing moving within an allowable percentage range of movement along the mean aerodynamic chord of the aircraft; a detachable wing tip for stabilizing the aircraft when said aircraft is loaded so as to cause the center of gravity to move beyond the allowable range of movement along said mean aerodynamic chord, said detachable wing displacing said chord so that the center of gravity of said fuselage and wing tip moves within the allowable percentage range along said displaced chord; and means for detaching said wing tip after said aircraft loading is varied so that the percentage range of movement of the center of gravity along the displaced chord is greater than that allowable for restoring the center of gravity movement to the allowable percentage range of movement along said first mentioned chord.

7. In an aircraft, a fuselage; a swept back wing secured to said fuselage, the center of gravity of said fuselage and wing moving within an allowable percentage range along the mean aerodynamic chord of said fuselage and wing; an auxiliary fuel tank; a detachable wing tip for supporting said tank and stabilizing said aircraft when said tank is filled, said tip and tank displacing the mean aerodynamic chord so that the center of gravity of said fuselage, wing, wing tip and tank moves within an allowable percentage range of movement along the displaced chord; means for detaching said wing tip after the fuel tank is emptied, the wing tip and tank causing the center of gravity to move along the displaced chord beyond the allowable percentage range of movement, the center of gravity after the detachment of the wing tip and tank being restored to movement along said first mentioned chord and within the allowable percentage range.

8. In an aircraft, a fuselage; a swept back wing secured to said fuselage, the center of gravity of said fuselage and wing moving within an allowable percentage range along the mean aerodynamic chord of said fuselage and wing; an auxiliary fuel tank; a detachable forwardly swept stub wing for supporting said tank and stabilizing said aircraft when said tank is filled, said stub wing and tank displacing the mean aerodynamic chord so that the center of gravity of said fuselage, swept back wing, stub wing and tank moves within an allowable percentage range of movement along the displaced chord; means for detaching said stub wing after said fuel tank is emptied, the stub wing and tank causing the center of gravity to move along the displaced chord beyond the allowable percentage range of movement, the center of gravity after the detachment of the stub wing and tank being restored to movement along said first mentioned chord and within the allowable percentage range.

ALEXANDER E. OSTROFF.

REFERENCES CITED

The following references are of record in the file of this patent:

UNITED STATES PATENTS

| Number | Name | Date |
|---|---|---|
| 2,105,307 | Akerman | Jan. 11, 1938 |
| 2,375,858 | Makaroff | May 15, 1945 |
| 2,416,104 | Lerche | Feb. 18, 1947 |
| 2,421,699 | Johnson | June 3, 1947 |

FOREIGN PATENTS

| Number | Country | Date |
|---|---|---|
| 872,789 | France | Feb. 23, 1942 |